United States Patent Office 2,720,496
Patented Oct. 11, 1955

2,720,496

COMPOSITION OF MATTER COMPRISING AN AQUEOUS DISPERSION OF A PLASTICIZED MIXTURE OF HIGH AND LOWER MOLECULAR WEIGHT POLYVINYL ACETATE

Collins E. Bushnell, Manheim Township, Lancaster County, Pa., assignor to Armstrong Cork Company, Lancaster, Pa., a corporation of Pennsylvania No Drawing. Application November 1, 1952,
Serial No. 318,341

5 Claims. (Cl. 260—29.6)

This invention relates to a composition of matter and more particularly to a composition which may be used as a weather-resisting coating material, an adhesive, a seal and finish coating for asphaltic materials, and other uses. The invention is especially useful in the heat insulation field where pipes are frequently covered with magnesia type insulation material and must be protected from the weather or from damage by mechanical abrasion. The covering is usually applied in split half-sections with a muslin cover, the cover being applied at the factory with a free flap, permitting installation of each section as a unit, with the flap being lapped over and cemented in place. Banding or wiring is then effected to hold the units in place. In some services, canvas may be cemented or sewn over the muslin cover to which has been applied a rosin sized paper to ensure smoothness. The canvas is sized and painted with one or two coats of oil paint. For outside use, the muslin cover is sometimes removed and the insulation wired or banded to the pipe. The insulation is then wrapped with a waterproof paper such as roofing felt which is cemented, wired, or banded in position. Cork pipe covering on low temperature lines, as in refrigerating systems, is usually coated with a factory applied asphaltic waterproofing composition. After application of the cork pipe covering this asphaltic composition is usually coated with an asphalt paint; and for decorative purposes, an asphalt based aluminum paint or other decorative paint that will not crack or cause bleeding of the asphalt is applied thereover.

The composition of the present invention may be used as the adhesive for securing the lapped-over portion of the conventional muslin cover on magnesia insulation, as an adhesive for cementing the canvas or other coverings in place, if they be employed, as a seal and finish coat over an asphalt coating if one be used, and as a finish coating to replace the oil paint customarily applied. The material is resistant to cracking and does not permit bleeding of asphalt therethrough. The composition is of such character that the use of canvas and oil paint coatings may be dispensed with and a much cheaper but equally satisfactory installation may be made by first sizing the muslin with a coat of the composition thinned with water, followed by the application of one or more coats of the composition without dilution.

The invention is not limited to any particular field of use; the composition may be used for inside as well as outside coatings, adhesives, seal coats, and the like.

According to the invention there are combined filler particles, including pigments, if desired, and a binder the essential ingredients of which consist of a dispersion in water of (a) a major amount by volume of a relatively high molecular weight polyvinyl acetate, (b) a lesser amount of a relatively low molecular weight polyvinyl acetate, and (c) a plasticizer for the polyvinyl acetate mixture.

A typical example of a composition of the present invention is as follows, all parts being given by weight:

*Example I*

| | |
|---|---|
| (a) Water dispersion of polyvinyl acetate—molecular weight about 242,000 (55% solids) | 398.8 |
| (b) Polyvinyl acetate — molecular weight about 39,000 | 39.3 |
| (c) Dimethyl phthalate | 78.8 |
| (d) Filler and pigments | 303.8 |
| (e) Sodium nitrite | 2.0 |
| (f) Dispersing agent | 1.8 |
| (g) Water | 177.5±30 |

The principal binder component (a) of the composition is the high molecular weight polyvinyl acetate. In the example given, the product had a molecular weight of about 242,000 determined by the viscosity method which is described in the article by R. H. Wagner, entitled "Intrinsic viscosities and molecular weights of polyvinyl acetate" appearing on page 21 of volume 2, Number 1, of the Journal of Polymer Chemistry, 1947. The viscosity of a 0.25 gram specimen of the polyvinyl acetate in a 100 cc. solution with bis (2-chloroethyl) ether as a solvent is 0.0227 poise at 25° C. The particles in the dispersion are about 0.5 to 1.5 microns in size. Other polyvinyl acetate polymerization products may be used, but they should have a molecular weight in the range between about 200,000 and 1,200,000 and an average particle size of 3.0 microns or less. The smaller particle size polyvinyl acetate dispersions generally are preferred where waterproofness of the dried film is important. Dispersions of the low viscosity (low molecular weight) polymers of polyvinyl acetate generally have a smaller average particle size than do the higher viscosity polymers.

The second essential component (b) of the composition is also a polyvinyl acetate polymerization product, this composition having a molecular weight in the range between 15,000 and 50,000 as determined by the viscosity method. In Example I the selected polyvinyl acetate had a molecular weight of 39,000 and a viscosity at 25° C. based on a 0.25 gram specimen in a 100 cc. solution with bis (2-chloroethyl) ether as a solvent of 0.0209 poise. For best results, the second component (b) should be incorporated with the high molecular weight polyvinyl acetate component (a) in the range of about 5 to 35 parts of component (b) for each 100 parts (on a solids basis) of the high molecular weight material, component (a).

The third essential component (c) of the composition is a plasticizer for the polyvinyl acetate of components (a) and (b). In the above example dimethyl phthalate is used. It may be incorporated directly into the low molecular weight polyvinyl acetate during polymerization of the polyvinyl acetate or it may be added separately.

Other plasticizers may be used in the compositions of this invention. Plasticizers such as acetyl tributyl citrate, methyl phthalyl ethyl glycollate (Santicizer M–17), alkyl-aryl phosphate (Santicizer 141), butyl phthalyl butyl glycollate (Santicizer B–16), dibutyl phthalate, tricresyl phosphate, 2-biphenyl diphenyl phosphate (Dow Plasticizer 5), chlorinated biphenyl (Aroclor 1242, 1254 and 1262) ortho nitro biphenyl, and others as well as combinations thereof may be used. This list of plasticizers is not complete; other plasticizers which exhibit compatibility with polyvinyl acetate also may be used alone or in combination with one or more of those specifically mentioned.

The particular plasticizer chosen and the amount of plasticizer to be employed will vary, of course, depending upon its effectiveness, the physical characteristics of the polyvinyl acetate materials to be plasticized and the consistency of the low molecular weight polyvinyl acetate-plasticizer combination, the use to which the composition is to be put, the effect of the plasticizer on the tensile strength and elongation characteristic of the dried film, the effect the plasticizer has on the aging of the film and shelf life of the composition, the volatility of the plasticizer from the film, and other variable factors. Generally, 10 to 50 parts by weight of plasticizer for each 100 parts by weight on a solids basis of the total polyvinyl acetate in the composition will be satisfactory. The ratio of plasticizer to low molecular weight polyvinyl acetate is preferably in the order 2 to 1 as in the example given above.

Some plasticizers reduce the tensile strength of the dried composition. For instance, dibutyl phthalate produces a weaker film than does acetyl tributyl citrate and in addition tends to cause a greater increase in viscosity on storage. The phosphate plasticizers in general show a tendency to cause film yellowing on aging at elevated temperatures but are less volatile and show less tendency to increase the viscosity of the composition upon prolonged storage than do others of the plasticizers. The range of usable plasticizers is wide; and by selection and formulation to enhance the strong points of the various plasticizers, the compounder will have no difficulty in producing the composition best suited for his particular use, following the general principles of this invention.

The tensile strength and elongation characteristics of a dried film of the composition of Example I are very good, the product having a tensile strength of 224 pounds per square inch and an elongation of 227.5% at break.

The following is another example of a composition of the present invention particularly useful as an adhesive or as a coating composition:

*Example II*

| | |
|---|---:|
| (a) Water dispersion of polyvinyl acetate—molecular weight about 1,100,000 (55% solids) | 398.8 |
| (b) Polyvinyl acetate (Vinylite AYAC)—molecular weight about 19,000 | 39.3 |
| (c) Acetyl tributyl citrate | 78.8 |
| (d) Filler and pigments | 303.8 |
| (e) Sodium nitrite | 2.0 |
| (f) Dispersing agent | 1.8 |
| (g) Water | 177.5±30 |

In this example the major component (a) has a higher molecular weight—1,100,000—than the corresponding component of Example I—molecular weight 242,000. The viscosity of the high molecular weight polyvinyl acetate of component (a) of this example at 25° C. based on a 0.25 gram specimen in a 100 cc. solution with m-cresol as a solvent is 0.2036 poise. The size of the particles in the dispersion is about 1.0 to 3.0 microns. The low molecular weight polyvinyl acetate, component (b), is a commercial grade of about 19,000 molecular weight and a viscosity at 25° C. of 0.0204 poise based on a 0.25 gram specimen in a 100 cc. solution with bis (2-chloroethyl) ether as a solvent.

In the preparation of the compositions of Examples I and II preferred practice is to dissolve the dispersing agent such as Darvan #1 and the sodium nitrite which, incidentally, serves as a rust inhibitor to lessen rusting of the metal containers in which the composition is usually packaged, in about half of the water, say 87.5 parts. Then the filler and pigments, such as titanium dioxide, 87.5 parts, 6-x Mineralite, a mica type filler, 77.5 parts, and York whiting, a calcium carbonate type filler, 138.8 parts, are dispersed in the water solution of dispersing agent and sodium nitrite. This produces a heavy paste-like mass into which is stirred the dispersion of polyvinyl acetate, followed by the low molecular weight polyvinyl acetate and the plasticizer mixture prepared by heating the two together, unless of course the two are combined during polymerization as previously mentioned. After thorough mixing, the desired amount of water to produce the required viscosity is added, generally in the order of 90 pounds, plus or minus 30 pounds, depending upon the use to which the composition will be put. For instance, a size coating will be more highly diluted than a finish coating, and an adhesive which is to be applied by a brush to the flaps of the muslin coverings on magnesia pipe covering, for instance, will generally be more dilute also. Frequently, the manufacturer may find it desirable to produce a composition of a suitable viscosity, and reduction thereof can be effected by the user by the mere addition of water.

The sodium nitrite may be replaced by other rust-inhibiting materials or may be omitted. Any of the well known dispersing agents may be employed, should dispersion otherwise be found difficult with the mixing tackle available.

The washability of coatings made in accordance with the invention may be improved by the addition of water-soluble silicones such as General Electric's SC50. This is more fully disclosed and claimed in the copending application of Alan R. McGarvey, Serial No. 395,623, filed December 1, 1953.

I claim:

1. A composition of matter comprising filler particles and a binder, the essential ingredients of the binder consisting of a dispersion in water of a mixture of (a) 100 parts by weight of polyvinyl acetate having a molecular weight of about 1,100,000 determined by the viscosity method, (b) 5 to 35 parts by weight of polyvinyl acetate having a molecular weight of about 15,000 to about 50,000 determined by the viscosity method, and (c) a plasticizer for components (a) and (b) in the ratio of 10 to 50 parts of component (c) for each 100 parts by weight on a solid basis of the total of components (a) and (b).

2. A composition of matter comprising filler particles and a binder, the essential ingredients of the binder consisting of a dispersion in water of a mixture of (a) 100 parts by weight of polyvinyl acetate having a molecular weight of about 1,100,000 determined by the viscosity method, (b) 5 to 35 parts by weight of polyvinyl acetate having a molecular weight of about 15,000 to about 50,000 determined by the viscosity method, and (c) a plasticizer for components (a) and (b) in the ratio of 10 to 50 parts of component (c) for each 100 parts by weight on a solids basis of the total of components (a) and (b), said plasticizer being selected from the group consisting of dimethyl phthalate, acetyl tributyl citrate, methyl phthalyl ethyl glycollate, and butyl phthalyl butyl glycollate.

3. A composition of matter comprising filler particles and a binder, the essential ingredients of the binder consisting of a dispersion in water of a mixture of (a) 100 parts by weight of polyvinyl acetate having a molecular weight of about 1,100,000 determined by the viscosity method, (b) 5 to 35 parts by weight of polyvinyl acetate having a molecular weight of about 15,000 to about 50,000 determined by the viscosity method, and (c) an acetyl dibutyl citrate plasticizer for components (a) and (b) in the ratio of 10 to 50 parts of component (c) for each 100 parts by weight on a solids basis of the total of components (a) and (b).

4. A composition of matter comprising filler particles and a binder, the essential ingredients of the binder consisting of a dispersion in water of a mixture of (a) 100 parts by weight of polyvinyl acetate having a molecular weight of about 1,100,000 determined by the viscosity method, (b) 5 to 35 parts by weight of polyvinyl acetate having a molecualr weight of about 19,000 determined by the viscosity method, and (c) a plasticizer for componets (a) and (b) in the ratio of 10 to 50 parts of component (c) for each 100 parts by weight on a solids basis of the total of components (a) and (b).

5. A composition of matter comprising filler particles and a binder, the essential ingredients of the binder consisting of a dispersion in water of a mixture of (a) 100 parts by weight of polyvinyl acetate having a molecular weight of about 1,100,000 determined by the viscosity method, the average particle size of the polyvinyl acetate in the water dispersion being 3.0 microns or less, (b) 5 to 35 parts by weight of polyvinyl acetate having a molecular weight of about 15,000 to about 50,000 determined by the viscosity method, and (c) a plasticizer for components (a) and (b) in the ratio of 10 to 50 parts of component (c) for each 100 parts by weight on a solids basis of the total of components (a) and (b).

References Cited in the file of this patent

UNITED STATES PATENTS

| | | |
|---|---|---|
| 1,984,678 | Herrmann et al. | Dec. 18, 1934 |
| 2,519,870 | Amigo | Apr. 22, 1950 |
| 2,536,470 | Schoenholz et al. | Jan. 2, 1951 |
| 2,567,678 | Morrison | Sept. 11, 1951 |

FOREIGN PATENTS

| | | |
|---|---|---|
| 558,100 | Great Britain | Dec. 21, 1943 |